(12) United States Patent
Hikosaka

(10) Patent No.: US 10,203,919 B2
(45) Date of Patent: Feb. 12, 2019

(54) IMAGE FORMING APPARATUS AND COMMUNICATION SYSTEM

(71) Applicant: KYOCERA Document Solutions Inc., Osaka-shi, Osaka (JP)

(72) Inventor: Ariyoshi Hikosaka, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/796,476

(22) Filed: Oct. 27, 2017

(65) Prior Publication Data

US 2018/0121144 A1    May 3, 2018

(30) Foreign Application Priority Data

Oct. 28, 2016 (JP) .................. 2016-211420

(51) Int. Cl.
  *G06F 3/12*    (2006.01)
  *H04N 1/32*    (2006.01)
  *H04W 36/00*   (2009.01)

(52) U.S. Cl.
  CPC .......... *G06F 3/1239* (2013.01); *G06F 3/1238* (2013.01); *G06F 3/1294* (2013.01); *H04N 1/32* (2013.01); *G06F 3/1204* (2013.01); *H04W 36/005* (2013.01)

(58) Field of Classification Search
  CPC .... G06F 3/1239; G06F 3/1238; G06F 3/1294; G06F 3/1204; H04N 1/32; H04W 36/005
  See application file for complete search history.

(56) References Cited

U.S. PATENT DOCUMENTS

2014/0157372 A1*  6/2014  Shimizu ............. H04N 1/00307
                                                          726/4
2016/0080594 A1*  3/2016  Kuroda .............. H04N 1/00514
                                                          358/1.15

FOREIGN PATENT DOCUMENTS

JP         2007251846 A     9/2007

* cited by examiner

*Primary Examiner* — Quang N Vo
(74) *Attorney, Agent, or Firm* — Alleman Hall Creasman & Tuttle LLP

(57) ABSTRACT

A login management portion performs user authentication on the basis of a user ID and allows login of a user. A transfer control portion transmits, to a predetermined call transfer control device, a transfer setting request for causing a voice communication device to change an incoming call destination of a telephone number that corresponds to the user ID of the user whose login has been allowed. The login management portion prohibits, when a first user logs in, login of a second user different from the first user, and allows, when the voice communication device starts voice communication of the telephone number that corresponds to the user ID of the first user, login of the second user while prohibiting use of the voice communication device by the second user different from the first user.

6 Claims, 5 Drawing Sheets

IMAGE FORMING APPARATUS AND COMMUNICATION SYSTEM

INCORPORATION BY REFERENCE

This application is based upon and claims the benefit of priority from the corresponding Japanese Patent Application No. 2016-211420 filed on Oct. 28, 2016, the entire contents of which are incorporated herein by reference.

BACKGROUND

The present disclosure relates to an image forming apparatus and a communication system.

In a certain communication system, when a multifunction peripheral registers terminal identification information of the multifunction peripheral and a telephone number of a user in an SIP server, the user is allowed to perform facsimile communication, on the basis of the telephone number of the user, using a multifunction peripheral when the user is away from home.

SUMMARY

An image forming apparatus according to the present disclosure includes: a voice communication device; a login management portion; and a transfer control portion. The login management portion performs user authentication on the basis of a user ID and allows login of a user. The transfer control portion transmits, to a predetermined call transfer control device, a transfer setting request for causing the voice communication device to change an incoming call destination of a telephone number that corresponds to the user ID of the user whose login has been allowed. The login management portion is configured to, when a first user logs in, prohibit login of a second user different from the first user, and is configured to, when the voice communication device starts voice communication of the telephone number that corresponds to the user ID of the first user, allow login of the second user while prohibiting use of the voice communication device by the second user different from the first user.

A communication system according to the present disclosure includes the above-described image forming apparatus, and the call transfer control device. The call transfer control device receives the transfer setting request and changes the incoming call destination in response to the transfer setting request. The call transfer control device transfers a call to the telephone number, to an incoming call destination presently assigned to the telephone number.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings.

Figure 1:
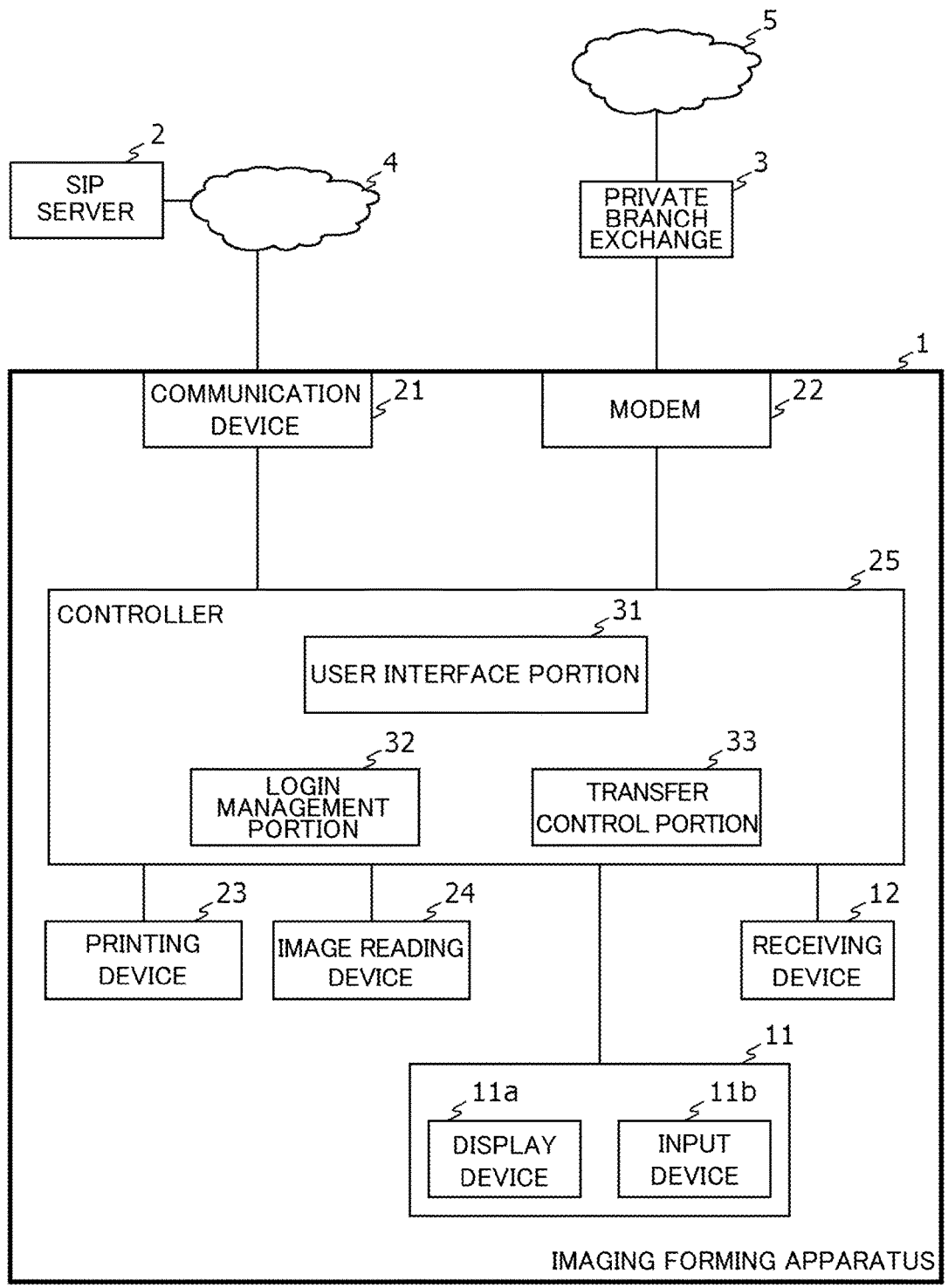
FIG. 1 is a block diagram showing an example of a communication system according to an embodiment of the present disclosure.

As shown in FIG. 1, a communication system according to an embodiment of the present disclosure includes an image forming apparatus 1, a Session Initiation Protocol (SIP) server 2, and a private branch exchange 3. The image forming apparatus 1 is connected to the private branch exchange 3 and a wide-area computer network 4, the SIP server 2 is connected to the wide-area computer network 4, and the private branch exchange 3 is connected to a public switched telephone network 5. The wide-area computer network 4 is a wide-area Internet Protocol (IP) network such as the internet.

The SIP server 2 functions as a call transfer control device of an IP telephone network. The private branch exchange 3 functions as a local call transfer control device of the public switched telephone network 5.

The image forming apparatus 1 is a multifunction peripheral having a printing function, an image reading function, a facsimile function, and a voice communication function. By the voice communication function, the user is allowed to make a telephone call using an IP telephone or a telephone in the public switched telephone network 5 (hereinafter, referred to as a general telephone).

The image forming apparatus 1 includes an operation panel 11, a receiving device 12, a communication device 21, a modem 22, a printing device 23, an image reading device 24, and a controller 25.

The operation panel 11 includes a display device 11a such as a liquid crystal display and an input device 11b such as a touch panel, and performs a display of an operation screen for the user and a detection of an input operation performed by the user. The display device 11a displays the operation screen to the user, and the input device 11b accepts the user operation inputted by the user.

The receiving device 12 includes: a microphone that detects a voice of the user; a speaker that outputs a voice to the user; and a sensor that detects a user operation for start and finish of voice communication. For example, the microphone and the speaker may be incorporated into a receiver that is separate from the body of the image forming apparatus 1, and a user operation of mounting or demounting the receiver onto or from the body of the image forming apparatus 1 may be detected as a user operation for start and finish of voice communication.

Figure 2:
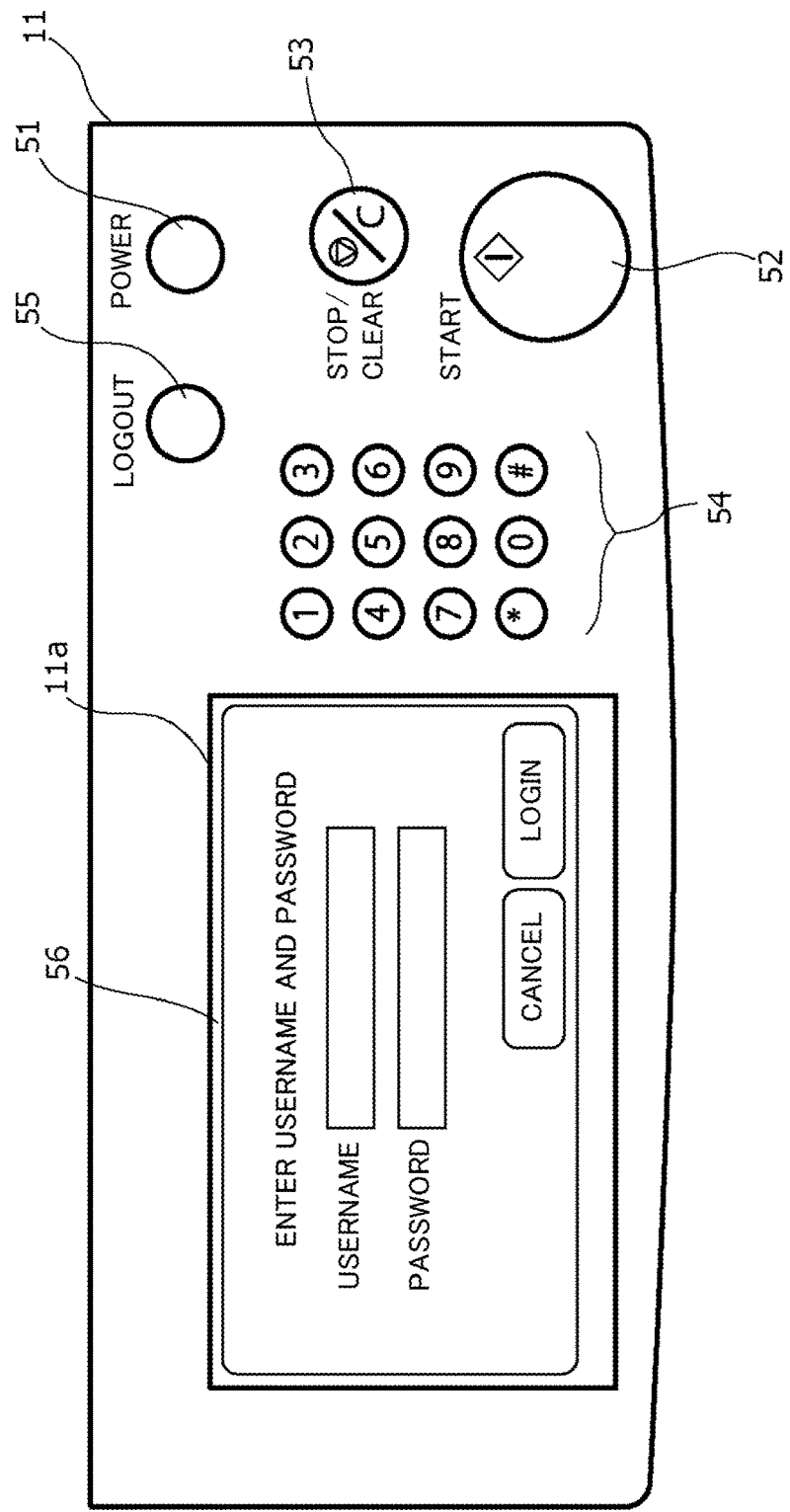
FIG. 2 is a front view of an operation panel 11 in FIG. 1.

The operation panel 11 shown in FIG. 2 includes hardware keys 51 to 55 and a touch panel 56 as the input device 11b. The hardware key 51 is a power key, the hardware key 52 is a start key, the hardware key 53 is a stop/clear key, the hardware key 54 is a numerical keypad, and the hardware key 55 is a logout key. The touch panel 56 is disposed on the display surface of the display device 11a. In the operation panel 11 shown in FIG. 2, a login screen corresponding to a state where no user logs in is displayed.

The communication device 21 is a device that is connected to the wide-area computer network 4, and that performs data communication with another device connected to the wide-area computer network 4 in accordance with a predetermined communication protocol. The communication device 21 functions as a voice communication device for the IP telephone.

The modem 22 is a device that is connected to the private branch exchange 3, and that performs voice communication with another device connected to the public switched telephone network 5, via the private branch exchange 3. The modem 22 is used for facsimile transmission and reception, and functions as a voice communication device for a telephone via the public switched telephone network 5.

The printing device 23 is an internal device that prints a document image onto a print sheet, for example, according to electrophotography. The image reading device 24 is an internal device that optically reads a document image from a document to generate image data of the document image.

The controller 25 includes a computer that includes a central processing unit (CPU), a read only memory (ROM), a random access memory (RAM), and the like (not shown), and loads a program stored in the ROM or a storage device (not shown), into the RAM, and executes the program, using the CPU, to implement various processing portions. The controller 25 may include an application specific integrated circuit (ASIC), and may cause the ASIC to execute a specific process.

Here, the controller 25 operates as a user interface portion 31, a login management portion 32, and a transfer control portion 33.

The user interface portion 31 causes the display device 11a of the operation panel 11 to display a screen, and causes a screen to be displayed on the display device 11a to transit in accordance with the input operation detected at the input device 11b of the operation panel 11.

The login management portion 32 performs user authentication on the basis of a user ID and allows login of a user. Specifically, the login management portion 32 executes user authentication on the basis of a user ID and a password that have been inputted to the login screen, by using an external authentication server or user data stored in a built-in non-volatile storage device (not shown). When the user authentication is successful, the login management portion 32 allows login of the user. When the user authentication fails, the login management portion 32 does not allow login of the user, and continuously displays the login screen.

Incidentally, in this type of communication system, during a period when a certain user logs in to the image forming apparatus 1 and is making a telephone call using the image forming apparatus 1, another user may not log in to the image forming apparatus 1 to use the multifunction peripheral. Since the processing of the original user is finished when the original user logs out for the other user, the telephone call may be disconnected. On the other hand, in the communication system according to the present disclosure, even when a certain user is performing voice communication using the image forming apparatus 1, another user can use the image forming apparatus 1.

The transfer control portion 33 transmits, to a predetermined call transfer control device (the SIP server 2 and the private branch exchange 3), a transfer setting request for causing the voice communication device to change the incoming call destination of a telephone number (an extension number or an external number) that corresponds to a user ID of a user whose login has been allowed (hereinafter, referred to as a login user). Upon reception of the transfer setting request, the call transfer control device temporarily changes the incoming call destination of the telephone number that corresponds to the user ID, in response to the received transfer setting request, from a default incoming call destination to a device that is a transmission source of the transfer setting request (that is, here, the image forming apparatus 1). Upon acceptance of the call to a telephone number of each user, the call transfer control device transfers the call to the incoming call destination presently assigned to the telephone number.

In a state where the telephone number that corresponds to the user ID is stored, as user data, in a storage device built in the image forming apparatus 1, the transfer control portion 33 may specify the telephone number of the login user on the basis of the user data, and may transmit the user ID of the user and the specified telephone number, together with the transfer setting request, to the call transfer control device. The call transfer control device may hold in advance the telephone number that corresponds to the user ID, and upon reception of the user ID of the user and the transfer setting request, the call transfer control device may specify the telephone number that corresponds to the user ID.

Further, when a first user (user who logs in while no user is in a login state) logs in, the login management portion 32 prohibits login of a second user different from the first user. Specifically, when allowing login of the first user, the login management portion 32 causes the user interface portion 31 to ensure that the display device 11a displays an operation screen for the first user and does not display a login screen for the second user different from the first user. Thus, the login of the second user is prohibited.

When the voice communication device (the communication device 21 or the modem 22) starts voice communication of the telephone number that corresponds to the user ID of the first user, the login management portion 32 allows login of the second user while prohibiting use of the voice communication device by the second user. Specifically, upon start of the voice communication of the first user, the login management portion 32 causes the user interface portion 31 to ensure that the display device 11a displays the login screen for the second user (second login screen). Thus, the second user can log in. However, the second login screen displays a message that the voice communication device (the communication device 21 or the modem 22) that is used for the voice communication of the first user cannot be used even if the second user logs in. When the second user logs in while the voice communication of the first user is performed, the function of using the voice communication device (the communication device 21 or the modem 22) that is used for the voice communication of the first user is prohibited.

That is, the user interface portion 31 (a) causes the display device 11a to display a first login screen (e.g., a screen shown in FIG. 2) in a state where no user logs in, (b) causes the display device 11a to display the operation screen for the first user (e.g., a screen shown in FIG. 3) in a state where the first user logs in, (c) causes the display device 11a to display the second login screen (e.g., a screen shown in FIG. 4) in a state where the voice communication of the first user is performed, the second login screen (e.g., a screen shown in FIG. 4), and (d) causes the display device 11a to display the operation screen for the second user in a state where the second user logs in. In the operation screen for the second user, use of the voice communication device is prohibited.

Figure 3:
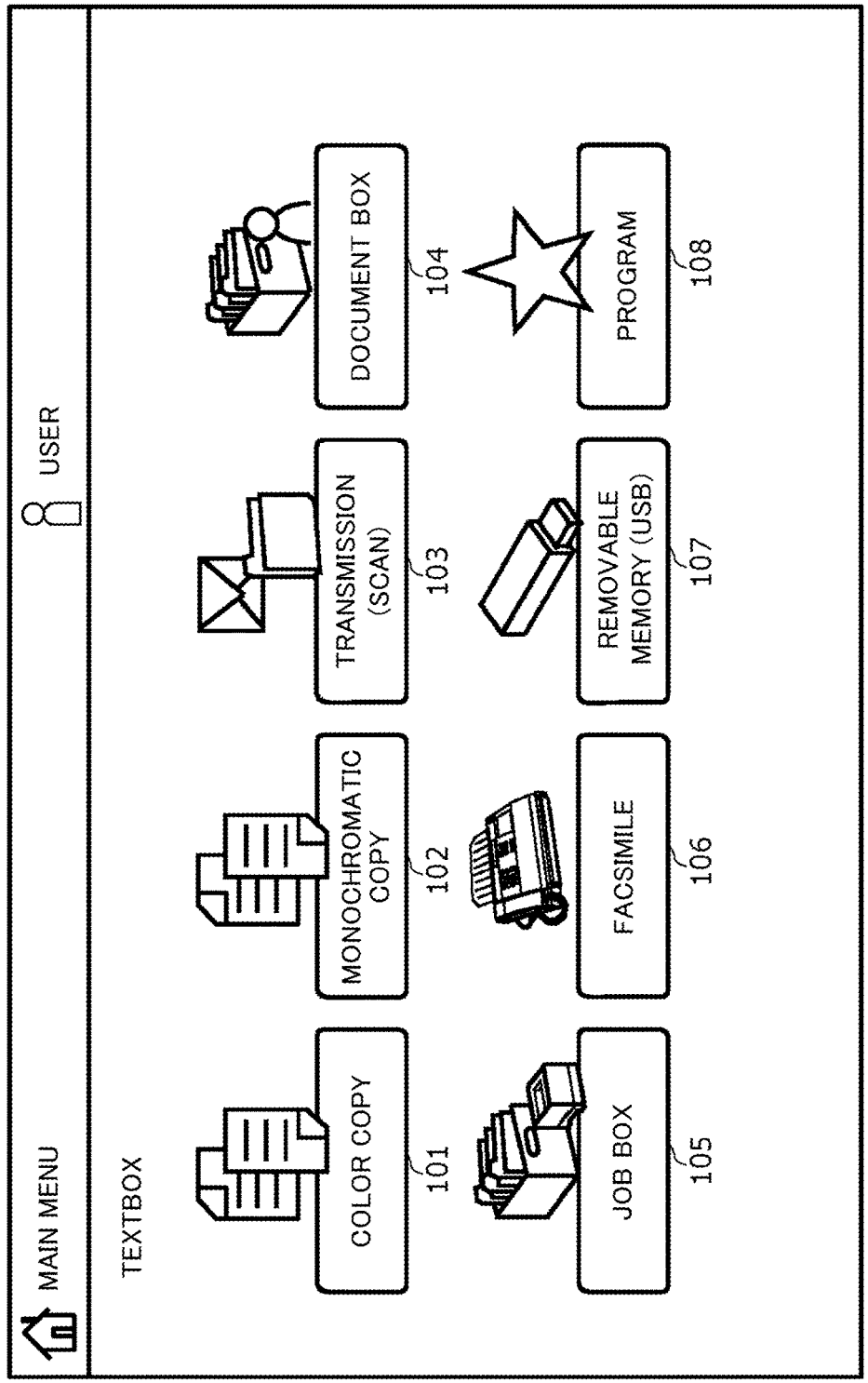
FIG. 3 is a diagram showing an example of an operation screen for a first user.

The operation screen shown in FIG. 3 is a main menu screen that is displayed immediately after the login. The main menu screen displays icons 101 to 107 having various types of functions such as a copy function and a transmission function, and a program icon 108 for displaying a screen of the list of programs. Since no function restriction is imposed on the first user, the first user can use all the functions corresponding to the icons 101 to 108.

Figure 4:
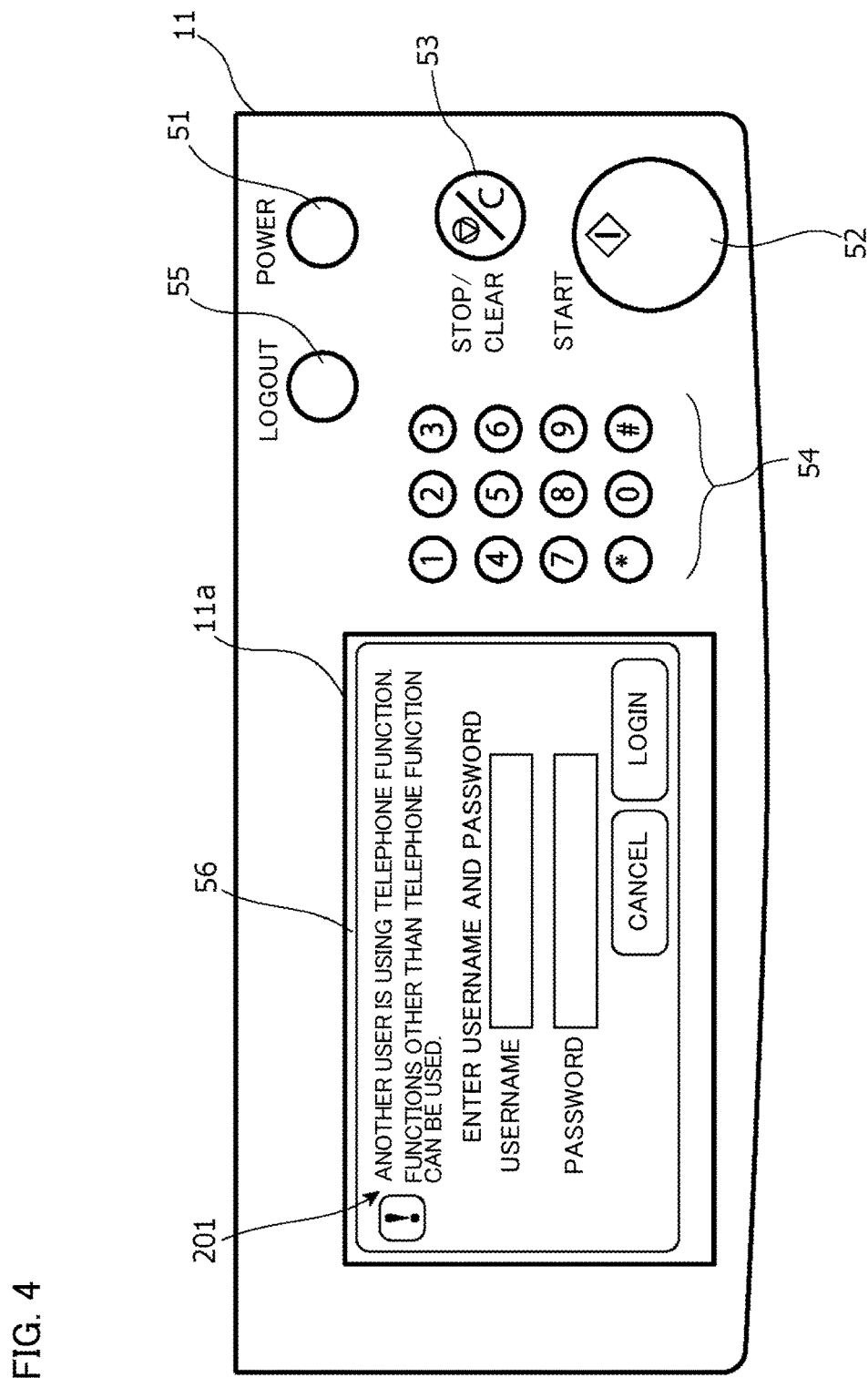
FIG. 4 is a diagram showing an example of a login screen for a second user.
Figure 5:
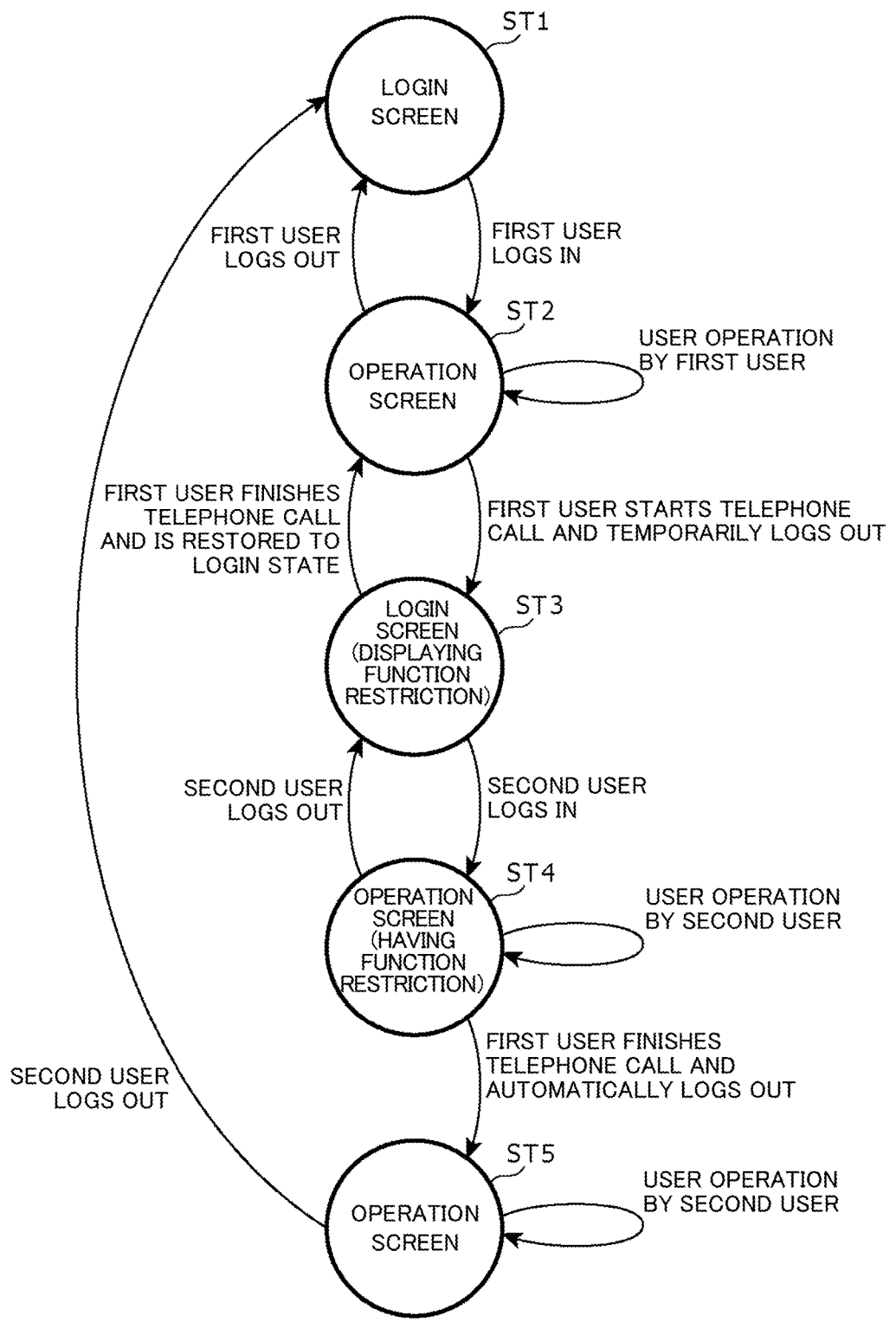
FIG. 5 is a state transition diagram showing an example of state transition of an image forming apparatus 1 shown in FIG. 1.

The login screen shown in FIG. 4 displays a message 201 that the voice communication device (the communication device 21 or the modem 22) cannot be used even if a user logs in.

Further, the login management portion 32 (a) causes the first user to log out (that is, temporarily log out), upon start of the voice communication of the first user, while causing login state information of the first user (e.g., information of the processing, of the first user, being performed) to be held and causing the voice communication of the first user to be continued, (b1) restores the first user to a login state, on the basis of the login state information (that is, restarts the above-described processing), in a case where the second user is not in a login state when the voice communication of the first user has been finished, and (b2) discards the login state information (that is, causes the first user to completely log out) in a case where the second user is in a login state when the voice communication of the first user has been finished. Thus, the login management portion 32 causes the first user to temporarily log out upon start of the voice communication, and restores the first user to the login state or causes the first user to log out upon finish of the voice communication.

Next, operations of the devices in the communication system according to the embodiment will be described.

In an initial state (a state ST1) where no user logs in, the login management portion 32 causes the user interface portion 31 to ensure that the display device 11a displays the first login screen (the login screen without the above-described message 201).

When the first user logs in on the first login screen, (a) as described above, the transfer control portion 33 transmits, to a call transfer control device (the SIP server 2 and the private branch exchange 3), a transfer setting request for transferring the call to the telephone number of the login user, to the image forming apparatus 1, and (b) the login management portion 32 is shifted to a state ST2, thus causing the user interface portion 31 to ensure that the display device 11a displays the operation screen for the first user.

When, in the state ST2, a user operation by the first user on the input device 11b has been detected, the user interface portion 31 causes the operation screen to transit in accordance with the user operation, and causes the internal device to execute a process for the user operation.

When, in the state ST2, the first user has performed a logout operation, the input device 11b detects the logout operation (e.g., pressing of the hardware key 55 for logout). When the logout operation has been detected, (a) the user interface portion 31 executes a logout process of the first user (e.g., the finish of the processing of the first user), and (b) the login management portion 32 returns to the state ST1, thus causing the user interface portion 31 to ensure that the display device 11a displays the first login screen.

When the first user performs a logout operation, the transfer control portion 33 transmits, to the call transfer control device, the transfer setting request for transferring the call to the telephone number of the first user, to the default incoming call destination.

When, in the state ST2, the communication device 21 or the modem 22 receives the call to the telephone number of the first user, first, the receiving device 12 outputs an incoming call sound, and thereafter, when a predetermined user operation is detected by the input device 11b, the user interface portion 31 controls the communication device 21 or the modem 22 to establish voice communication with the calling device.

When the voice communication of the first user has been established and started, the login management portion 32 is shifted to a state ST3 and causes the user interface portion 31 to display the second login screen, and automatically causes the first user to temporarily log out while holding the login state information of the first user.

Then, when, in the state ST3, another user (the second user) logs in on the second login screen, (a) at this time point, the transfer control portion 33 does not transmit, to the call transfer control device, the transfer setting request for transferring the call to the telephone number of the second user, to the image forming apparatus 1, and (b) the login management portion 32 is shifted to a state ST4, thus causing the user interface portion 31 to display the operation screen for the second user.

The operation screen for the second user is the same as the operation screen for the first user. However, in the operation screen for the second user, the function of using the communication device 21 or the modem 22 that is used for the voice communication of the first user cannot be selected. For example, since the communication device 21 is used when the voice communication of the first user is voice communication through the IP telephone, the user interface portion 31 disables selection of the transmission function by deleting or greying out the icon 103 for the transmission function. In addition, for example, since the modem 22 is used when the voice communication of the first user is voice communication of a telephone in the public switched telephone network 5, the user interface portion 31 disables selection of the facsimile function by deleting or greying out the icon 106 for the facsimile function.

When, in the state ST4, a user operation by the second user on the input device 11b has been detected, the user interface portion 31 causes the operation screen to transit in accordance with the user operation, and causes the internal device to execute a process for the user operation.

When, in the state ST3 (that is, in a state where the second user does not log in), the finish of the voice communication of the first user has been detected, the login management portion 32 restores the login state of the first user, on the basis of the login state information of the first user, and is shifted to the state ST2, thus causing the user interface portion 31 to ensure that the display device 11a displays again the operation screen for the first user.

Meanwhile, when, in the state ST4, (that is, in a state where the second user logs in), the finish of the voice communication of the first user has been detected, the login management portion 32 is shifted to a state ST5, discards the login state information of the first user, and cancels prohibition of use of the function of using the voice communication device used by the first user, and the user interface portion 31 cancels non-display or greying out of the icon corresponding to the function whose use is prohibited, in the operation screen for the second user. Thus, the second user can use such a function. When, in the state ST4, the finish of the voice communication of the first user has been detected, the transfer control portion 33 transmits, to the call transfer control device, the transfer setting request for transferring the call to the telephone number of the first user, to the default incoming call destination, and the transfer setting request for transferring the call to the telephone number of the second user, to the voice communication device of the image forming apparatus 1.

When, in the state ST4, the second user has performed the logout operation and then the input device 11b detects a logout operation, (a) the user interface portion 31 executes the logout process of the second user (e.g., the finish of the processing of the second user), and (b) the login management portion 32 returns to the state ST3, thus causing the user interface portion 31 to ensure that the display device 11a displays the second login screen.

Meanwhile, when, in the state ST5, the second user has performed the logout operation and then the input device 11b detects a logout operation, (a) the user interface portion 31 executes the logout process of the second user (e.g., the finish of the processing of the second user), and (b) the login management portion 32 returns to the state ST1, thus causing the user interface portion 31 to ensure that the display device 11a displays the first login screen.

When, in the state ST5, the second user performs a logout operation, the transfer control portion 33 transmits, to the call transfer control device, the transfer setting request for transferring the call to the telephone number of the second user, to the default incoming call destination.

As described above, according to the above embodiment, even when a certain user is performing voice communication using the image forming apparatus 1, another user can use the image forming apparatus 1.

Various changes and modifications of the above-described embodiment are obvious to a person skilled in the art. Such changes and modifications may be made without any deviation from the spirit and scope of the present disclosure and without reducing the intended advantages. That is, such changes and modifications are intended to be included in the claims.

For example, in the above embodiment, in a state where the call to the telephone number of the first user is transferred to an incoming call destination other than the voice communication device of the image forming apparatus 1 (for example, the default incoming call destination) but voice communication is not established, upon reception of the above-described call transfer request from the voice communication device of the image forming apparatus 1, the call transfer control device (the SIP server 2 and the private branch exchange 3) may immediately stop the transfer of a call to the incoming call destination other than the voice communication device and may transfer the call to the voice communication device of the image forming apparatus 1.

Thus, even when the device at the default incoming call destination receives an incoming call while the first user is moving from the device at the default incoming call destination to the image forming apparatus 1, the first user can accept the call and make a telephone call using the image forming apparatus 1 at the movement destination.

In addition, in the above embodiment, in a state where the call to the telephone number of the first user is received but voice communication is not established, when the input device 11b detects a predetermined user operation (e.g., pressing of a specific call transfer key (not shown)), the voice communication device of the image forming apparatus 1 may transmit the call transfer request for transferring the call to a specific external terminal device (e.g., the terminal device of the first user) and, upon reception of the call transfer request, the call transfer control device may stop the transfer of the call to the voice communication device and may transfer the call to the external terminal device.

Thus, even when the image forming apparatus 1 receives an incoming call while the first user is using the image forming apparatus 1, the first user, at a distance from the image forming apparatus 1, can accept the call and make a telephone call using his/her terminal device (e.g., the default incoming call destination, and a specific mobile terminal device that is designated in advance).

In the above embodiment, login may be allowed using an ID card. In that case, in the first login screen (e.g., the screen shown in FIG. 2) and the second login screen (e.g., the screen shown in FIG. 4), a message that login using the ID is possible may also be displayed.

The present disclosure is applicable, for example, to an image forming apparatus such as a multifunction peripheral.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus, comprising:
a voice communication device;
a login management portion configured to perform user authentication on the basis of a user ID and allow login of a user; and
a transfer control portion configured to transmit, to a predetermined call transfer control device, a transfer setting request for causing the voice communication device to change an incoming call destination of a telephone number that corresponds to the user ID of the user whose login has been allowed, wherein
the login management portion is configured to, when a first user logs in, prohibit login of a second user different from the first user, and is configured to, when the voice communication device starts voice communication of the telephone number that corresponds to the user ID of the first user, allow login of the second user while prohibiting use of the voice communication device by the second user different from the first user.

2. The image forming apparatus according to claim 1, further comprising:
a display device; and
a user interface portion configured to cause the display device to display a screen, wherein
the user interface portion (a) causes the display device to display a first login screen in a state where no user logs in, (b) causes the display device to display an operation screen for the first user in a state where the first user logs in, (c) causes the display device to display a second login screen in a state where the voice communication of the first user is performed, and (d) causes the display device to display an operation screen for the second user in a state where the second user logs in, and
in the operation screen for the second user, use of the voice communication device is prohibited.

3. The image forming apparatus according to claim 1, wherein,
the login management portion (a) causes the first user to log out, upon start of voice communication of the first user, while causing login state information of the first user to be held and causing the voice communication of the first user to be continued, (b1) restores the first user to a login state, on the basis of the login state information, in a case where the second user is not in a login state when the voice communication of the first user has been finished, and (b2) discards the login state information in a case where the second user is in a login state when the voice communication of the first user has been finished.

4. A communication system, comprising:
the image forming apparatus according to claim 1; and
the call transfer control device configured to receive the transfer setting request and change the incoming call destination in response to the transfer setting request, wherein
the call transfer control device transfers a call to the telephone number, to an incoming call destination presently assigned to the telephone number.

5. The communication system according to claim 4, wherein,
in a state where the call is transferred to the incoming call destination other than the voice communication device but voice communication is not established, upon reception of a call transfer request, the call transfer control device immediately stops a transfer of the call to the incoming call destination other than the voice communication device and transfers the call to the voice communication device.

6. The communication system according to claim 4, wherein
the image forming apparatus further includes an input device configured to detect a user operation,
in a state where the call is received but the voice communication is not established, when the input device detects a predetermined user operation, the voice communication device transmits a call transfer request for transferring the call to a predetermined external terminal device, and
upon reception of the call transfer request, the call transfer control device stops a transfer of the call to the voice communication device and transfers the call to the external terminal device.

* * * * *